United States Patent [19]

Kakihara et al.

[11] Patent Number: 4,912,645

[45] Date of Patent: Mar. 27, 1990

[54] AUTOMOTIVE NAVIGATION SYSTEM

[75] Inventors: Masaki Kakihara; Futoshi Shoji, both of Hiroshima, Japan

[73] Assignee: Mazda Motor Corporation, Hiroshima, Japan

[21] Appl. No.: 174,418

[22] Filed: Mar. 25, 1988

[30] Foreign Application Priority Data

Mar. 26, 1987 [JP] Japan ................................ 62-72711
Mar. 26, 1987 [JP] Japan ................................ 62-72712

[51] Int. Cl.⁴ .......................................... G06F 15/50
[52] U.S. Cl. ................................ 364/449; 340/988; 340/995; 342/357; 73/178 R; 364/457
[58] Field of Search ............... 364/443, 444, 449, 457, 364/459; 342/352, 357; 340/52 D, 988, 990, 995; 73/178 R

[56] References Cited

U.S. PATENT DOCUMENTS

| | | | |
|---|---|---|---|
| 4,630,292 | 12/1986 | Juricich et al. | 340/520 |
| 4,672,382 | 6/1987 | Fukuhara et al. | 342/357 |
| 4,688,176 | 8/1987 | Hirata | 73/178 R |
| 4,743,913 | 5/1988 | Takai | 342/357 |
| 4,758,959 | 7/1988 | Thoone et al. | 364/449 |

FOREIGN PATENT DOCUMENTS 62-885   1/1987   Japan .................................. 342/357

*Primary Examiner*—Gary Chin
*Attorney, Agent, or Firm*—Sixbey, Friedman, Leedom & Ferguson

[57] ABSTRACT

An automotive navigation system has a receiver for receiving data signals on present position of the vehicle transmitted from satellites. A present position detecting system detects the present position of the vehicle on the basis of the data signals. A display device shows the present position of the vehicle on the basis of the output of the present position detecting system. Change of the output of the present position detecting system to be given to the display device is inhibited when the vehicle is at a stop.

9 Claims, 13 Drawing Sheets

AUTOMOTIVE NAVIGATION SYSTEM

BACKGROUND OF THE INVENTION

1. Field of the Invention

This invention relates to an automotive navigation system, and more particularly to an automotive navigation system having a satellite-utilizing positioning system which receives radio waves from artificial satellites and detects the present position of a vehicle.

2. Description of the Prior Art

As disclosed in Japanese Unexamined Patent Publication No. 58(1983)-70117, there has been known an automotive navigation system in which the present position of the vehicle is shown on a display device together with a map of the area around the present position. As the means for detecting the present position of the vehicle, there has been put into practice a present position detecting system in which an azimuth sensor such as a geomagnetism sensor is employed. That is, the traveling distance and the traveling azimuth of the vehicle from a reference position are detected by means of a vehicle speed sensor and an azimuth sensor, and the present position of the vehicle is determined on the basis of the detected traveling distance and the detected traveling azimuth. However, such a present position detecting system is disadvantageous in that since the present position is measured as, say, a position relative to the reference position, the accuracy of the positioning is deteriorated due to measuring errors in the traveling distance and/or the traveling azimuth.

Such a problem can be overcome by measuring the present position of the vehicle as, say, an absolute position by use of radio waves transmitted from artificial satellites. For example, this can be accomplished by use of a GPS (Global Positioning System) which is now in the process of development. By use of a GPS, the present position of a vehicle can be determined with an accuracy of measurement of about 30 meters (in the case of C/A code which is to be opened to the public) on the basis of radio waves transmitted from four artificial satellites (generally called "NAVSTAR").

In the vehicle provided with a navigation system having a satellite-utilizing positioning system in which the present position of the vehicle is detected by use of a GPS, a map of the area where the vehicle is traveling is displayed, for instance, as a picture on a CRT carried by the vehicle and the detected present position is shown as a spot on the picture. The present position must be displayed in response to movement of the vehicle, and accordingly, the radio waves from the respective satellites are repeatedly received by the navigation system at predetermined intervals, and the present position is determined each time the radio waves are received.

In such a navigation system, while the vehicle is at a stop, the spot representing the present position must remain stationary on the picture. However, since the detected present position for a given position of the vehicle can fluctuate within about 30 meters as described above and the fluctuation is apt to be increased depending on the positions of the satellites and/or radio interference, the spot representing the present position of the vehicle moves, due to the fluctuation in the detected present position, each time the radio waves from the satellites are received and the present position of the vehicle is determined on the basis of the received radio waves, though actually the vehicle remains stationary.

SUMMARY OF THE INVENTION

In view of the foregoing observations and description, the primary object of the present invention is to provide an automotive navigation system in which the spot on the picture representing the present position of the vehicle is kept stationary while the vehicle is at a stop even if the data on the present position fluctuate while the vehicle is at a stop.

In accordance with the present invention, there is provided an automotive navigation system comprising a receiving means for receiving data signals on present position of the vehicle transmitted from satellites, a present position detecting means for detecting the present position of the vehicle on the basis of the data signals, a display device for showing the present position of the vehicle on the basis of the output of the present position detecting means, a vehicle speed sensor for detecting the vehicle speed, and a data change limiting means which limits change of the output of the present position detecting means to be given to the display device when the vehicle speed is lower than a predetermined speed.

In a preferred embodiment of the present invention, the outputs of the present position detecting means during the time the vehicle speed is lower than the predetermined speed are averaged to obtain the present position of the vehicle with more accuracy, and when the vehicle speed reaches the predetermined speed, the averaged output of the present position detecting means is given to the display device to show the present position on the basis of the averaged output.

Since the detected present positions can be considered to be substantially normally distributed about the true present position, a more accurate present position can be obtained by averaging outputs of the present position detecting means during the time the vehicle speed is substantially zero.

DESCRIPTION OF THE PREFERRED EMBODIMENTS

Figure 1:
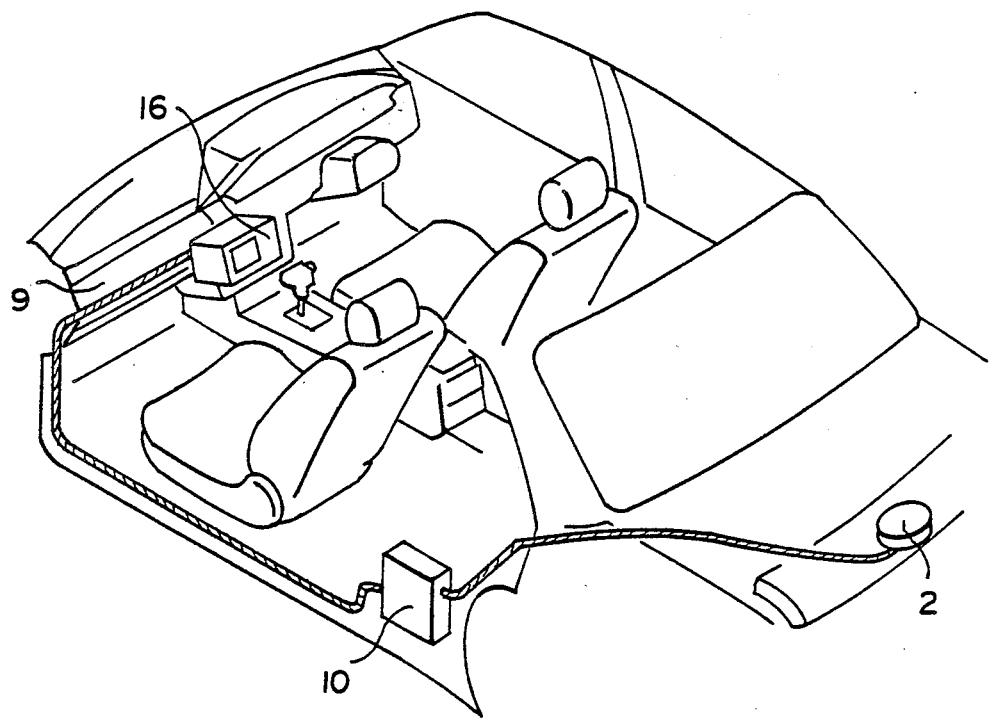
FIG. 1 is a partly cutaway perspective view showing a vehicle provided with an automotive navigation system in accordance with the present invention.
Figure 2:
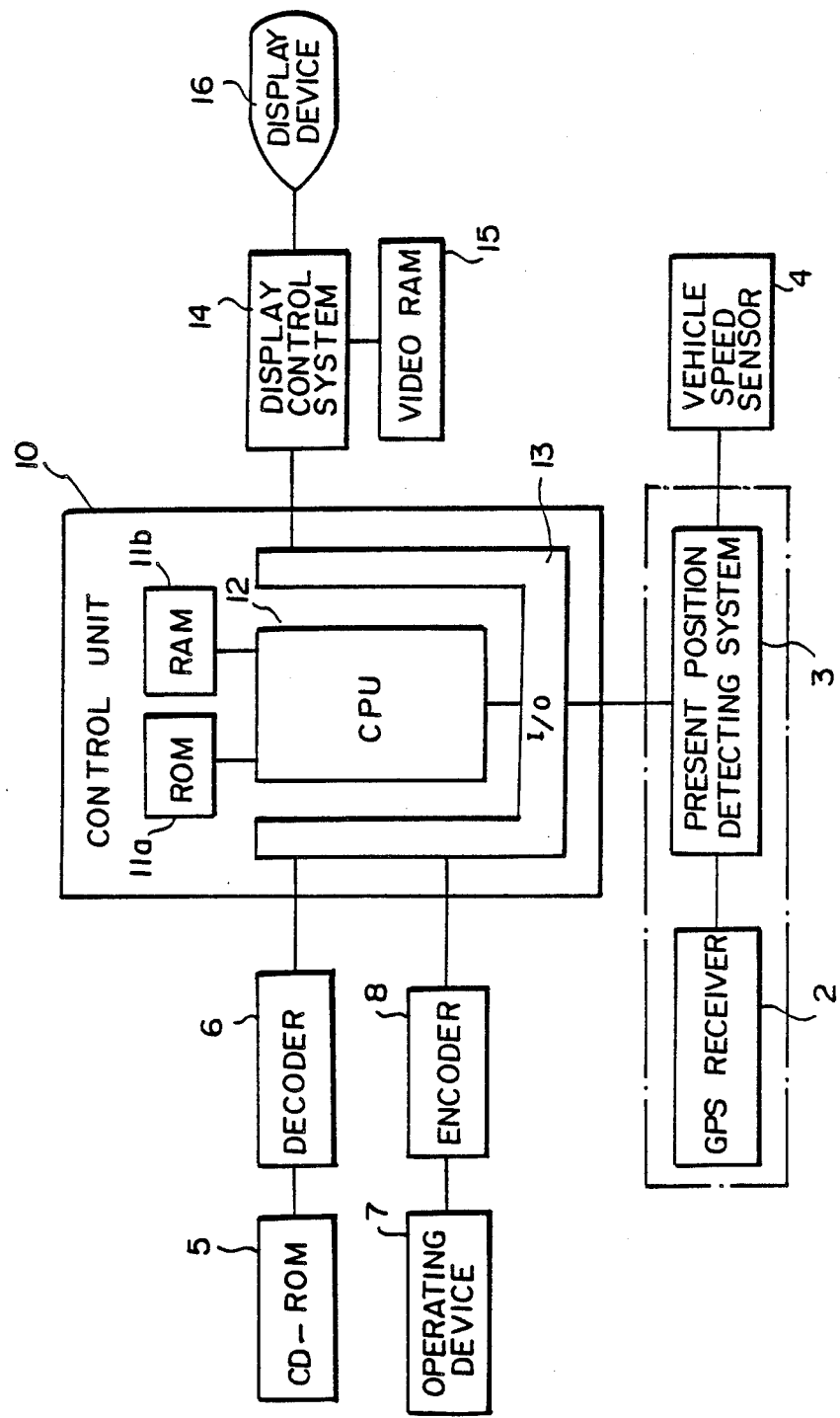
FIG. 2 is a schematic view showing an arrangement of an automotive navigation system in accordance with an embodiment of the present invention.

As sown in FIGS. 1 and 2, an automotive navigation system in accordance with an embodiment of the present invention comprises a GPS receiver 2 for receiving radio waves from satellites, a vehicle speed sensor 4, a present position detecting means 3 for detecting the present position of the vehicle on the basis of the radio waves received by the GPS receiver 2, and a control unit 10 which receives the output signal of the present position detecting system 3 and controls various signals as will become apparent later. A memory 5 in which map information and the like are stored and which may be, for instance, a compact disk or a ROM is connected to the control unit 10 by way of a decoder 6, and an operating device 7 having various control keys is connected to the control unit 10 by way of an encoder 8. Further, a display device (e.g., a cathode-ray tube) 16 and a video RAM 15 are connected to the control unit 10 by way of a display control system 14.

In the memory 5, there are stored maps and the like bearing thereon various information for guiding the driver. The operating device 7 comprises various control keys (not shown) for manually changing the contents to be displayed and the like.

The control unit 10 comprises a microcomputer having an operational circuit 12 and ROM 11a and RAM 11b connected to the operational circuit 12. The operational circuit 12 is connected to the present position detecting system 3 and the like by way of an interface 13. In the control unit 10, the present position of the vehicle is calculated on the basis of a signal from the present position detecting system 3, and a map of the area around the present position of the vehicle is retrieved from the memory 5. The map thus retrieved from the memory 5 is displayed on the screen of the display device 16 or stored in the video RAM 15.

Figure 3:
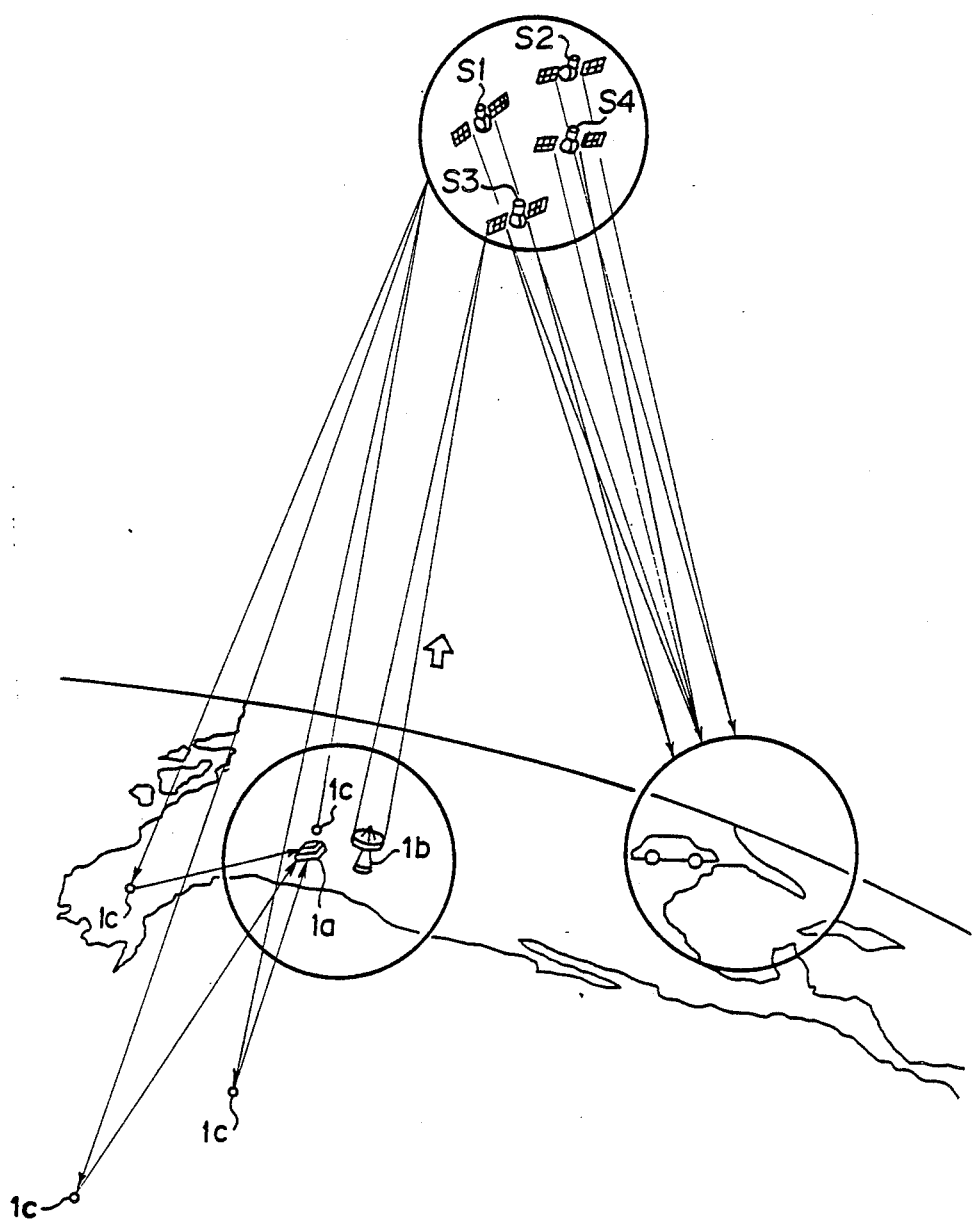
FIG. 3 is a schematic perspective view for illustrating a GPS.

The GPS receiver 2 and the present position detecting system 3 together form a satellite-utilizing positioning system which forms a user side portion of the GPS. As shown in FIG. 3, in the GPS, eight to twenty-one artificial satellites are controlled by a main control station 1a on the ground by way of four ground antennas 1b, and the satellite-utilizing positioning system receives radio waves emitted from four satellites S1 to S4 in the field of view, and determines the present position of the vehicle on the basis of the received radio waves. The accuracy of positioning by the satellite-utilizing positioning system can be deteriorated depending on the position of the satellites, perturbation of the motion of the satellites, the condition of the ionosphere and the like, and sometimes positioning by the satellite-utilizing positioning system becomes locally infeasible, though for a short time. Further, where the radio waves from the satellites cannot be received or are difficult to receive, e.g., the inside of a tunnel or a ground location blocked by an obstacle, positioning by the satellite-utilizing positioning system becomes infeasible or difficult.

The rate of deterioration of the accuracy of positioning by the satellite-utilizing positioning system depends upon the deterioration coefficient and the field intensity. That is, the deterioration coefficient is a value determined according to the geometric relation between the satellites and the vehicle upon positioning, and as the deterioration coefficient increases, positioning error increases, deteriorating the accuracy of positioning. Other factors which can deteriorate the accuracy of positioning appear as deterioration of the field intensity. When the deterioration coefficient increases and/or the field intensity is deteriorated, positioning error is increased. The deterioration coefficient can be calculated on the basis of data on the positions of the satellites utilized for positioning which are sent from the respective satellites on the basis of the result of tracking the satellites by the ground antennas 1b and data reception at monitor stations 1c on the ground. The field intensity can be detected on the basis of intensity of received radio waves.

Figure 4:
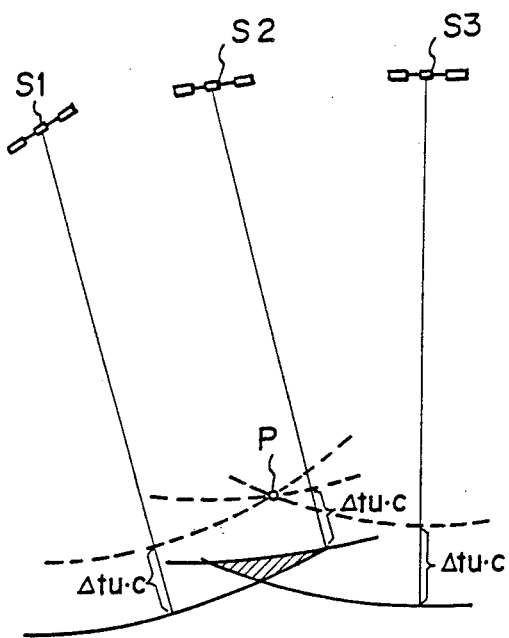
FIG. 4 is a view for illustrating the principle of positioning using a GPS.

The principle of positioning by the GPS is as follows. Assuming that the transmitting point and the receiving point are respectively provided with clocks which are in perfect synchronization with each other and the transmitting signal is controlled by the clocks, the propagation delay time between the transmitting point and the receiving point can be detected by clocking the time the transmitting signal is received at the receiving point, and the distance between the transmitting point and the receiving point can be obtained by multiplying the propagation delay time by the velocity of light. When it is assumed that there are three satellites S1, S2 and S3 in the field of view of the user as shown in FIG. 4 and the satellites S1 to S3 transmit distance measuring signals under the control of clocks which are in synchronization with each other, the distances between the receiving point P and the satellites S1 to S3 can be determined by clocking the times the respective measuring signals are received, whereby the receiving point P can be determined as the intersection of sphericities having the respective centers on the satellites S1 to S3. (FIG. 4 shows this two-dimensionally for the purpose of simplicity.) However, it is technically very difficult and disadvantageous from the viewpoint of the manufacturing cost of the receiver to synchronize the clock at the receiving point with the clocks at the transmitting point, i.e., on the satellites. This problem can be overcome by increasing the number of the satellites from which the receiver receives radio waves. If the clock at the receiving point is $\Delta tu$ behind the clocks on the satellites, the detected distances between the receiving point P and the satellites, i.e., the radii of said three sphericities, become larger than the actual values by $\Delta tu.c$ (c representing the velocity of light) and the three circles which should intersect with each other at a point cannot do so as shown by the solid lines in FIG. 4. By correcting the value of $\Delta tu.c$, the position of the receiving point P and the value of $\Delta tu$ can be simultaneously determined. In the GPS, a measured value of the distance between a receiving point and a satellite i which differs from the true value Ri of the same by $\Delta tu.c$ is called a false distance. The false distance $Ri'$ between the receiving point P and the satellite i is represented by a formula $$Ri' = Ri + c\Delta tai + c(\Delta tu - \Delta tsvi)$$

wherein Δtai represents the delay time of a radio wave in the ionosphere and the troposphere, and Δtsvi represents the time offset of the clock on the satellite i. Instead of synchronizing the atomic clocks on the respective satellites, the time offset of the atomic clock on each satellite is measured and predicted to convert it into a form which enables calculation of Δtsvi, and the time offset in the converted form is transmitted. In order to effect three-dimensional positioning, false distances are detected for four satellites and four unknowns, i.e., three coordinates and Δtu, are determined on the basis of the false distances. Similarly, the three-dimensional velocity of the user can be measured on the basis of detected values of Doppler frequencies of the signals from the respective satellites, i.e., detected values of the rates of change in the false distances between user and satellites.

When position of the user is to be determined on the basis of the positions of the satellites, data on positions of the satellites which are constantly changing and the conditions of the clocks on the respective satellites must be given to the user. These data are transmitted from the satellites in a manner described later.

Figure 5:
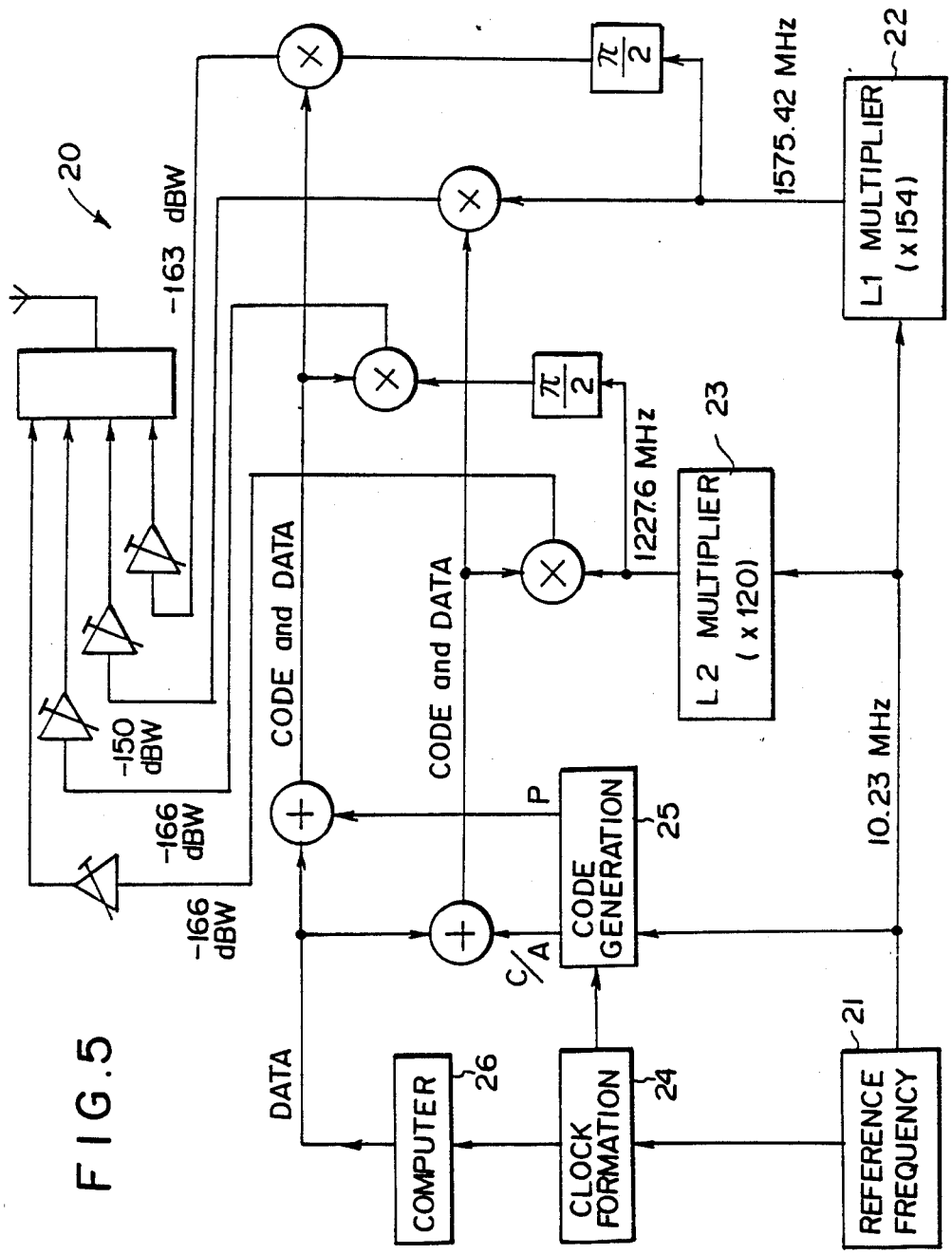
FIG. 5 is a block diagram showing a transmitting circuit on the satellite.

Each of the satellites is provided with a receiving circuit (not shown) for receiving a radio wave transmitted from the main control station 1a by way of the antenna 1b and a transmitting circuit 20 shown in FIG. 5. The transmitting circuit 20 comprises a reference frequency oscillating circuit 21 which outputs a reference frequency signal at, for instance, 10.23 MHz, a first multiplier 22 which multiplies the frequency of the reference frequency signal output from the reference frequency oscillating circuit 21 by 154 to form an L1 carrier (1575.42 MHZ) as a first carrier, and a second multiplier 23 which multiplies the frequency of the reference frequency signal by 154 to form an L2 carrier (1227.6 MHZ) as a second carrier. The transmitting circuit 20 further comprises a clock formation circuit 24 which forms a clock signal having a predetermined period on the basis of the reference frequency signal, a code generating circuit 25 which forms two kinds of code signals called P code and C/A code on the basis of the reference frequency signal and the clock signal, and a computer 26 which outputs data on the position of the satellite which is changing from moment to moment and on the condition of tee clock on the satellite under the timing-control of the clock signal. The P code is a secret code having a high accuracy and is available only to the military and other limited users. The P code is superposed on data output from the computer 26 and is then transmitted by orthogonal modulation of both the L1 and the L2 carriers. The repetition frequency of the P code is 10.23 Mbit/s and the duration of the P code is one week. The C/A code is used for rough positioning (normal positioning) and acquisition of the P code, and is available to the public. The C/A code is superposed on data output from the computer 26 and is then transmitted by modulation of both the L1 and the L2 carriers. The repetition frequency of the C/A code is 1.023 Mbit/s and the duration of the C/A code is 1023 bits. That is, the C/A code is repeated every 1 ms. The C/A code is generated, for instance, by a Gold code generating circuit comprising a pair of ten-stage shift registers. Data to be output from the computer 26 are stored in a memory circuit (not shown) on the satellite on the basis of measurement and prediction at a control section on the ground, and are successively read out. These data are transmitted at a predetermined timing at a transmission speed of, for instance, 50 bit/s. These data include a telemeter language, an ionosphere correction parameter, a delay correction for a single-wave receiver, a date of data on a clock correction, a reference time for clock correction, a GPS system time, a date of orbit prediction, a reference time for orbital elements, a mean anomaly at a reference time for orbital elements, eccentricity, a square root of the longer diameter, a right ascension of an ascending node, inclining angle of the orbit, a perigee argument, a perturbation of an ascending node, a mean motion correction, a parameter for an inclining angle correction, a correction term for an orbital disturbance, an identification number of the satellite, a reference time for a data subframe, condition of the satellite and the like. Further, almanac data of the other satellites in the system is included in the said data to enable prediction of the period for which the receiver of the user can receive the signals from the satellites, selection of combination of the satellites in the field of view providing the best positioning accuracy, presetting of the receiving circuit in order to acquire the signals from the satellites at the earliest possible moment, and the like.

Said control section comprises the main control station 1a, the ground antennas 1b disposed at fixed points (expected to be at least four in number) on the ground, and the monitor stations 1c disposed at fixed points (expected to be at least four in number) on the ground. The main control station 1a is a manned facility having a large computer and a series of operation control tables which tracks the satellites by way of the ground antennas 1b, predicts the clocks on the satellites and orbits of the satellites on the basis of the result of the tracking, and transmits data to store the predicted clocks and orbits in the memories on the satellites in order to broadcast them. Further, the main control station 1a receives telemetry data for controlling the satellites and commands. The monitor station 1c is an unmanned facility provided with a receiver for receiving the signals from the satellites, an atomic clock, and meteorological instrumentation for calculating the tropospheric delay.

Figure 6:
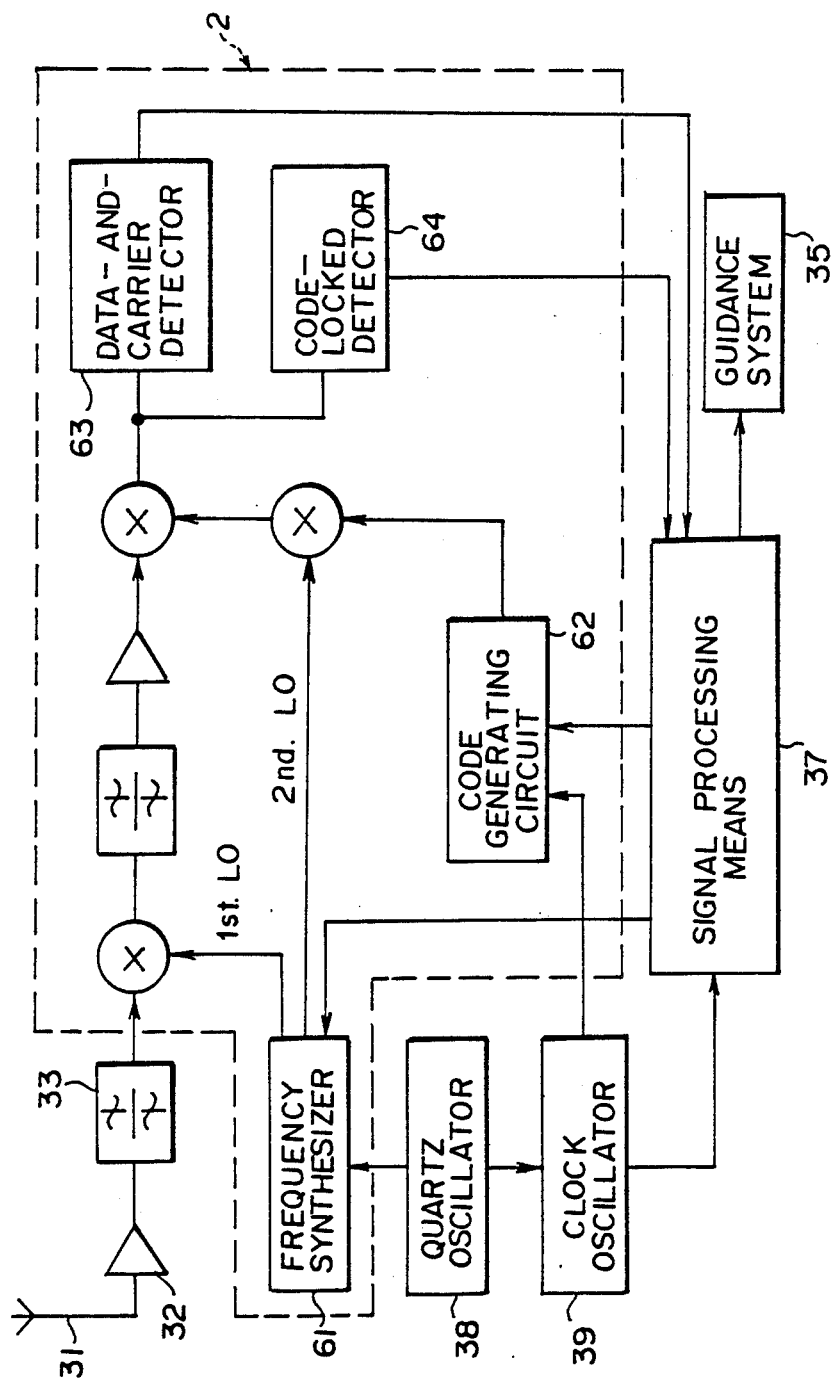
FIG. 6 is a block diagram showing a satellite-utilizing positioning system.

As shown in FIG. 2 and as described above, the satellite-utilizing positioning system comprises the GPS receiver 2 for receiving the signals from the satellites and the present position detecting system 3 which determines the present position on the basis of the received signals and outputs a position signal representing the present position. As shown in FIG. 6, the satellite-utilizing positioning system includes a quartz oscillator 38 which outputs said reference frequency signal as an overall timing control signal, and a clock oscillator 39 which forms, on the basis of the reference frequency signal, a clock signal for controlling the timing of operation of a signal processing means 37. An antenna 31, a pre-amplifier 32 and a band filter 33 are connected to the front stage of the GPS receiver 2.

The GPS receiver 2 comprises a frequency synthesizer 61 which produces a signal having the same pattern as data on the carriers transmitted from the transmitting circuit 20 on each satellite, position of the satellite and condition of the clock on the satellite on the basis of the reference frequency signal generated by the quartz oscillator 38, a code generating circuit 62 which receives a clock signal output from the clock oscillator 39 and forms a code signal having the same pattern as the distance measuring signal, a data-and-carrier detector 63 which correlatively detects the data on the clock on the satellite and the orbit of the satellite and carriers under the control of the output signals of the frequency synthesizer 61 and the code generating circuit 62, and a code-locked detector 64 which correlatively detects the distance measuring signals under the control of the code signal output from the code generating circuit 62. The signal processing means 37 is time-controlled by the clock signal output from the clock oscillator 39.

Though the GPS receiver 2 shown in FIG. 6 has a single receiving channel, the GPS receiver may be provided with two receiving channels so that one of the channels can be exclusively used for switching reception of the signals from the satellites in the field of view, and the other channel is used for receiving the data broadcast from the respective satellites and for preliminary acquisition of the signal from the satellite which is due to be received next. With this arrangement, interruption of positioning during reception of the data from the satellites can be avoided. When a receiver having five channels is used, switching of satellites can be effected in an instant by continuously tracking four satellites with four of the channels while the satellite due to be used next is preliminarily acquired with the other channel.

In the GPS, errors in measuring distances are all converted into distances which are referred to as "UERE" (user equivalent range error). The causes of the UERE and the nominal values of the UERE in the case of the P code for the respective causes are shown in Table 1. In the case of the C/A code, the UERE caused by the ionosphere and the receiver is expected to be several times as much as in the case of the P code.

The positioning error (positioning accuracy) in the GPS depends solely upon the product of the UERE and the deterioration coefficient GDOP. In the case of the C/A code, the nominal value of the positioning accuracy is 40 m (50%) in the term of the probable radial error.

TABLE 1

| Kinds and values of UERE (P code) | | |
|---|---|---|
| Space part | Stability of clock on satellite | 4.5 m |
|  | Vibration of satellite | 3.0 |
|  | Other | 0.5 |
| Control part | Orbit prediction | 2.5 |
|  | Other | 0.5 |
| User part | Ionospheric propagation delay | 2.3 |
|  | Tropospheric propagation delay | 2.0 |
|  | Receiver noise | 1.5 |
|  | Multipath | 1.2 |
|  | Other | 0.5 |

Figure 7:
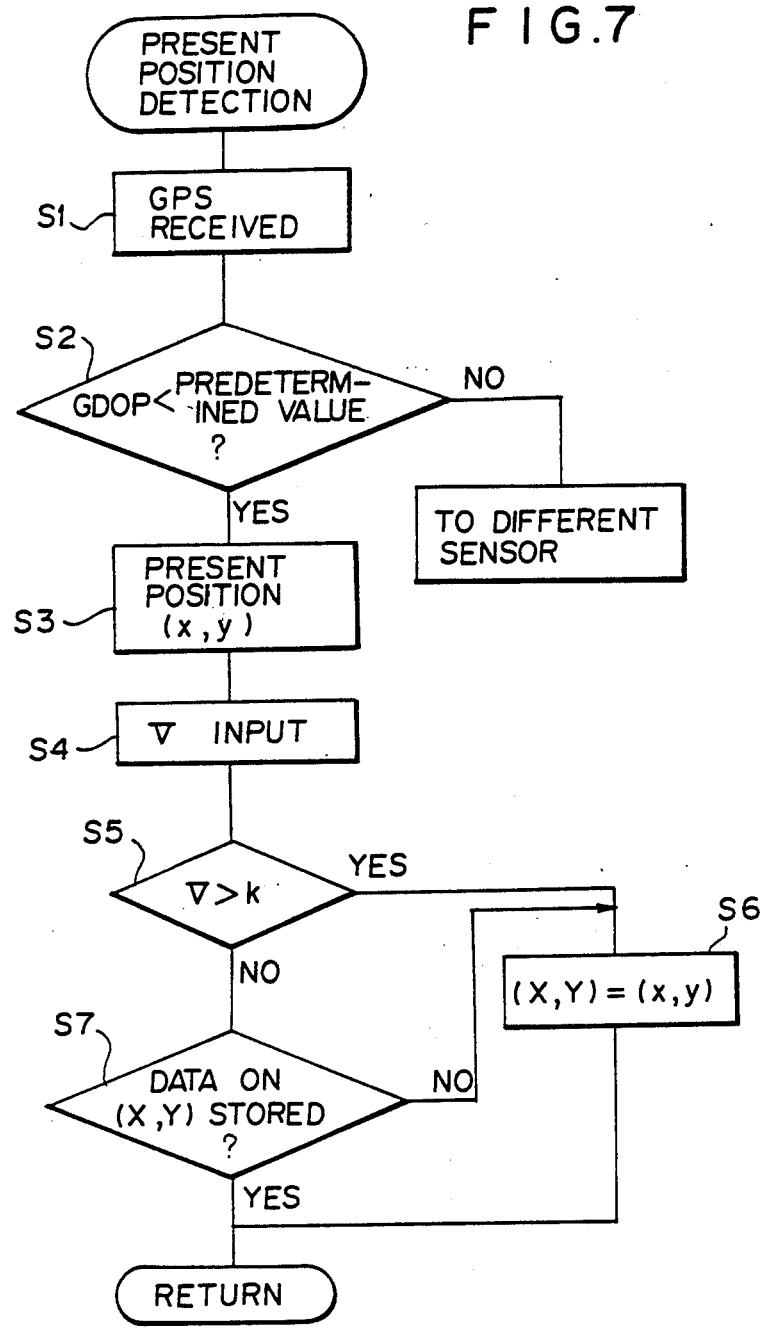
FIG. 7 is a flow chart for illustrating the operation of the navigation system of the embodiment.

With reference to the flow chart in FIG. 7, present position detection in the navigation system of this embodiment will be described, hereinbelow. In FIG. 7, radio waves from the satellites are received by the GPS receiver 2 in step S1, and in step S2 it is determined whether the deterioration coefficients GDOP are smaller than a predetermined value. When it is determined in the step S2 that the deterioration coefficient is not smaller than the predetermined value, present position detection is transferred to a different present position detecting system as will become apparent later. Otherwise, the present position of the vehicle, co-ordinates (x, y), is calculated on the basis of the data received in step S3. Then in steps S4 and S5 it is determined whether the vehicle speed V is higher than a predetermined speed k. When it is determined that the vehicle speed V is higher than the predetermined speed k, the present position calculated in the step S3 is transmitted to the control unit 10 and to the display device 16 by way of the display control system 14 to be displayed on the CRT of the display device 16 (step S6). In this case, the present position which changes with the movement of the vehicle is shown as a spot which moves on the CRT since the present position detection is repeated at predetermined intervals. When it is determined that the vehicle speed V is not higher than the predetermined speed k, that is, that the vehicle is at a stop, it is determined in step S7 whether data on the present position (X, Y) have been stored. When it is determined that data on the present position (X, Y) have not been stored, the present position as calculated in the step S3 is transmitted to the control unit 10. Otherwise, the present position of the vehicle is not determined. That is, when the vehicle is at a stop, the data of the present position are not refreshed until the vehicle is started again, and on the other hand, when the navigation system begins to be operated while the vehicle is at a stop, the data on the present position are fixed at those obtained in the step S3. Accordingly, in accordance with this embodiment, the spot on the CRT representing the present position cannot be moved until the vehicle is started again even if the data on the present position received change during the stop.

Figure 9:
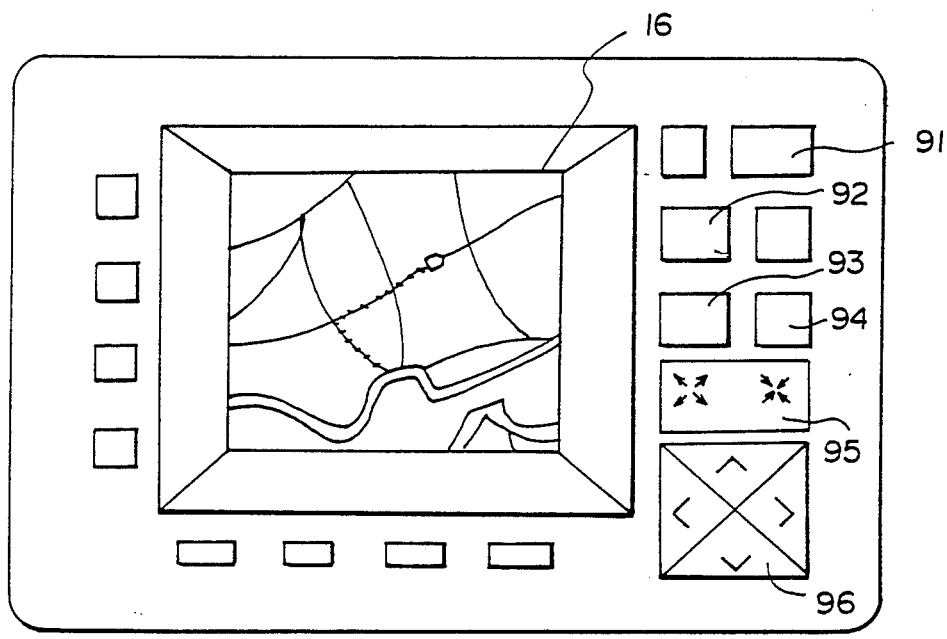
FIG. 9 is a front view showing a navigation unit to be mounted on the dashboard of the vehicle in the navigation system of this embodiment.

As shown in FIGS. 1 and 9, the operating device 7 (FIG. 2) is incorporated with the display device (CRT) 16 into a navigation unit which is mounted on the dashboard 9 of the vehicle, and is provided with a plurality of control keys including an on-off key 91 for turning on and off the navigation system, a list key 92 for changing the contents to be displayed on the CRT 16, e.g., selectively showing gas stands, parking lots and the like in the map displayed on the CRT 16, a cancel key 93 for cancelling the content to be displayed, a reset key 94 for resetting the content to be displayed, a scale-up-and-down key 95 for scaling up and down the picture on the CRT 16 and a scroll key 96. These keys may be of a type pictorially displayed on the CRT 16.

Figure 8:
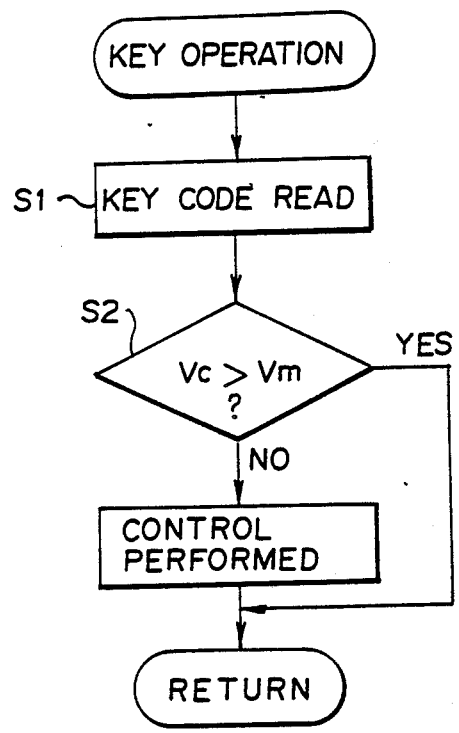
FIG. 8 is a flow chart for illustrating the controlling operation of the control keys.

The control keys are generally operated by the driver. However, during travel this is not preferred from the viewpoint of safety. Especially during high speed travel, it is very dangerous for the driver to select one of the keys and operate it. Accordingly, the navigation system of this embodiment is controlled to reject non-essential operation of keys while the vehicle is traveling at high speed. This control is done according to the flow chart shown in FIG. 8. In FIG. 8, when one of the keys is operated, the code of the key is read in step S1, and in step S2 it is determined whether the present vehicle speed Vc is higher than a predetermined speed Vm. When it is determined that the present vehicle speed Vc is higher than the predetermined speed Vm, this flow is immediately ended, and accordingly the operation of the key is ignored. On the other hand, when the present vehicle speed Vc is not lower than the predetermined speed Vm, the control corresponding to the operated key is performed in step S3.

Though, in the flow chart shown in FIG. 8, operation of any key is ignored when the vehicle speed Vc is higher than the predetermined speed Vm, the navigation system may be arranged to accept operation of some of the keys even if the present vehicle speed Vc is higher than the predetermined speed Vm.

Figure 10A:
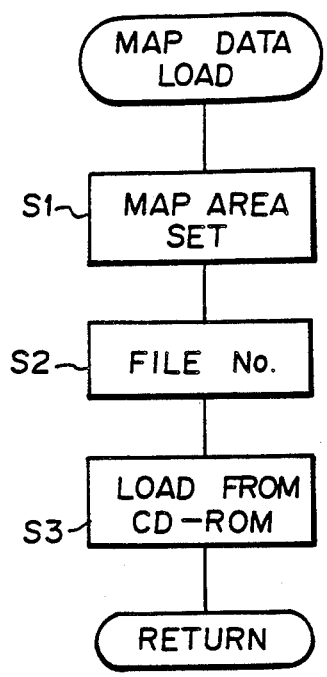
FIG. 10A is a flow chart for illustrating the control of the map to be shown on a CRT.
Figure 10B:
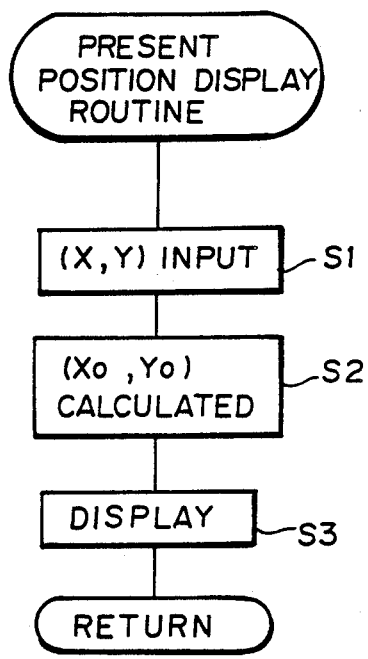
FIG. 10B is a flow chart for illustrating the controlling of the spot that shows the present position.

FIG. 10A shows a flow chart according to which the map to be displayed on the CRT 16 is determined, and FIG. 10B shows a flow chart according to which the present position of the vehicle is displayed on the CRT 16.

In FIG. 10A, a map area including the present position detected by the present position detecting system 3 is set in step S1, and in step S2 the file reference number under which the map area is stored in the memory 5 is determined. Then the map including the present position is loaded from the memory (CD-ROM) 5 in step S3.

In FIG. 10B, the present position (X , Y) in an absolute coordinate system as detected by the present position detecting system 3 is input into the control unit 10 in step S1. Then in step S2, the position (Xo , Yo) on the CRT 16 representing the present position (X , Y) is calculated, and in step S3, the present position is shown as a spot on the CRT 16.

Figure 2A:
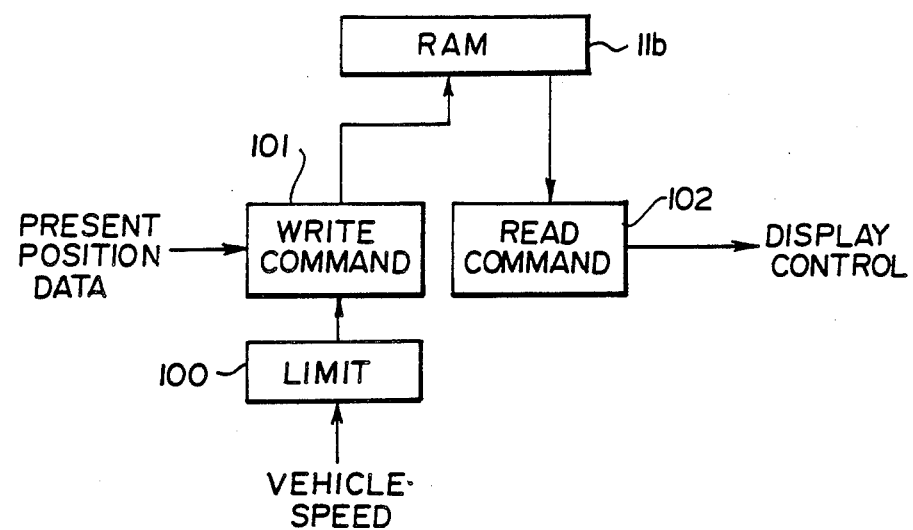
FIG. 2A is a schematic view for illustrating a modification of the control unit.

Though, in the embodiment described above, the present position of the vehicle is not determined when the vehicle speed is not higher than the predetermined speed, the present position may be calculated irrespective of the vehicle speed so long as the calculated data are not transmitted to the display device. In the modification shown in FIG. 2A, the vehicle speed signal is input into a write limiting section 100, and data on the present position of the vehicle calculated by the present position detecting means are stored b in the RAM 11b under the control of a write command section 101 which is operated every time the data on the present position are input. The RAM 11b reads out data stored therein under the control of a read command section 102 which is operated at predetermined intervals. The write limiting section 100 prevents the write command section 101 from permitting the data to be stored in the RAM 11b when the vehicle speed is lower than the predetermined speed.

Figure 11:
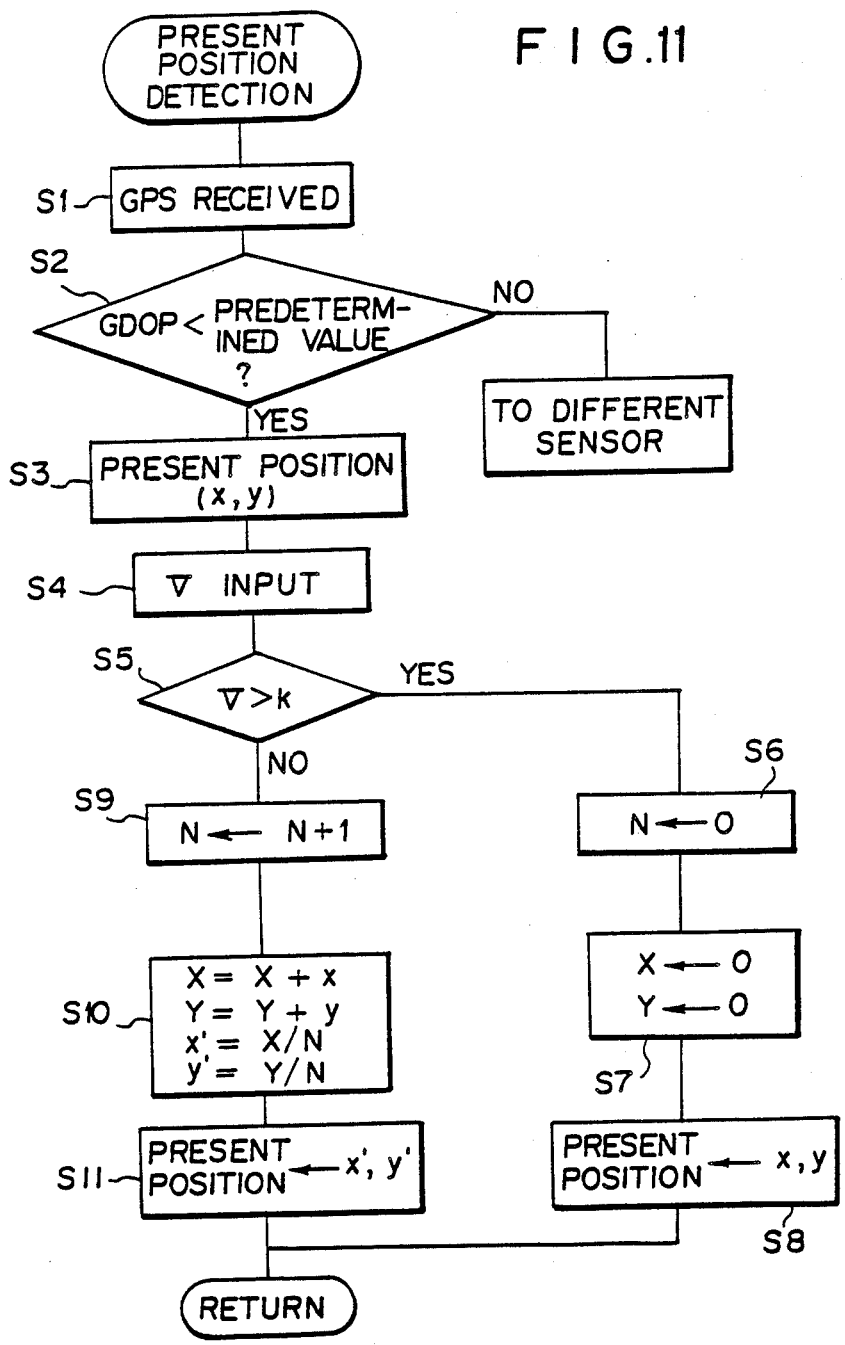
FIG. 11 is a flow chart for illustrating the operation of the navigation system of another embodiment.

With reference to the flow chart in FIG. 11, present position detection in a navigation system in accordance with another embodiment of the present invention will be described, hereinbelow. In FIG. 11, radio waves from the satellites are received by the GPS receiver 2 in step S1 and in step S2 it is determined whether the deterioration coefficients GDOP are smaller than a predetermined value. When it is determined in the step S2 that the deterioration coefficient is not smaller than the predetermined value, present position detection is transferred to a different present position detecting system as will become apparent later. Otherwise, the present position of the vehicle, coordinates (x, y), is calculated on the basis of data received in step S3. In steps S4 and S5 it is then determined whether the vehicle speed V is higher than a predetermined speed k. When it is determined that the vehicle speed V is higher than the predetermined speed k, a counter N is reset to 0 in step S6 and the sums of X and Y are reset to 0 in step S7. Then, the present position calculated in the step S3 is transmitted to the control unit 10 and to the display device 16 by way of the display control system 14 to be displayed on the CRT of the display device 16 (step S8). In this case, the present position which changes with the movement of the vehicle is shown as a spot which moves on the CRT since the present position detection is repeated at predetermined intervals. When it is determined that the vehicle speed V is not higher than the predetermined speed k, that is, that the vehicle is at a stop, the counter N is incremented by one in step S11. Further, in step S10, the values x and y representing the present position detected in the step S3 are added to the sums of X and Y, and the sum of X and x and the sum of Y and y are respectively divided by the value of the counter N, thereby obtaining average values x' and y' which are stored as the values representing the present position. These steps are repeated so long as the vehicle is at a stop, thereby refreshing the average values x' and y' every time positioning is effected When the vehicle is started again, the present position of the vehicle is displayed on the CRT 16 on the basis of the last average values x' and y'.

As shown in the flow charts in FIGS. 7 and 11, it is preferred that an azimuth sensor such as a geomagnetism sensor be employed instead of the present position detecting system using the GPS when the deterioration coefficient GDOP becomes larger than a predetermined value such as when the vehicle is in a tunnel. In the geomagnetism sensor, positioning accuracy is adversely affected mainly by error in measurement of the traveling azimuth, and accordingly, if the error in measurement of the traveling azimuth can be corrected with a high accuracy, the positioning accuracy by the geomagnetism sensor can be substantially improved. Correction of the error in measurement of the traveling azimuth by the geomagnetism sensor can be effected by use of averaged GPS data on the position of two places at which the vehicle stops. That is, by use of the averaged GPS data on the position of two places at which the vehicle stops, the traveling azimuth can be accurately detected and by correcting the traveling azimuth detected by the geomagnetism sensor, the positioning accuracy by the geomagnetism sensor can be substantially improved. For example, this can be done according to the flow chart shown in FIG. 12.

Figure 12:
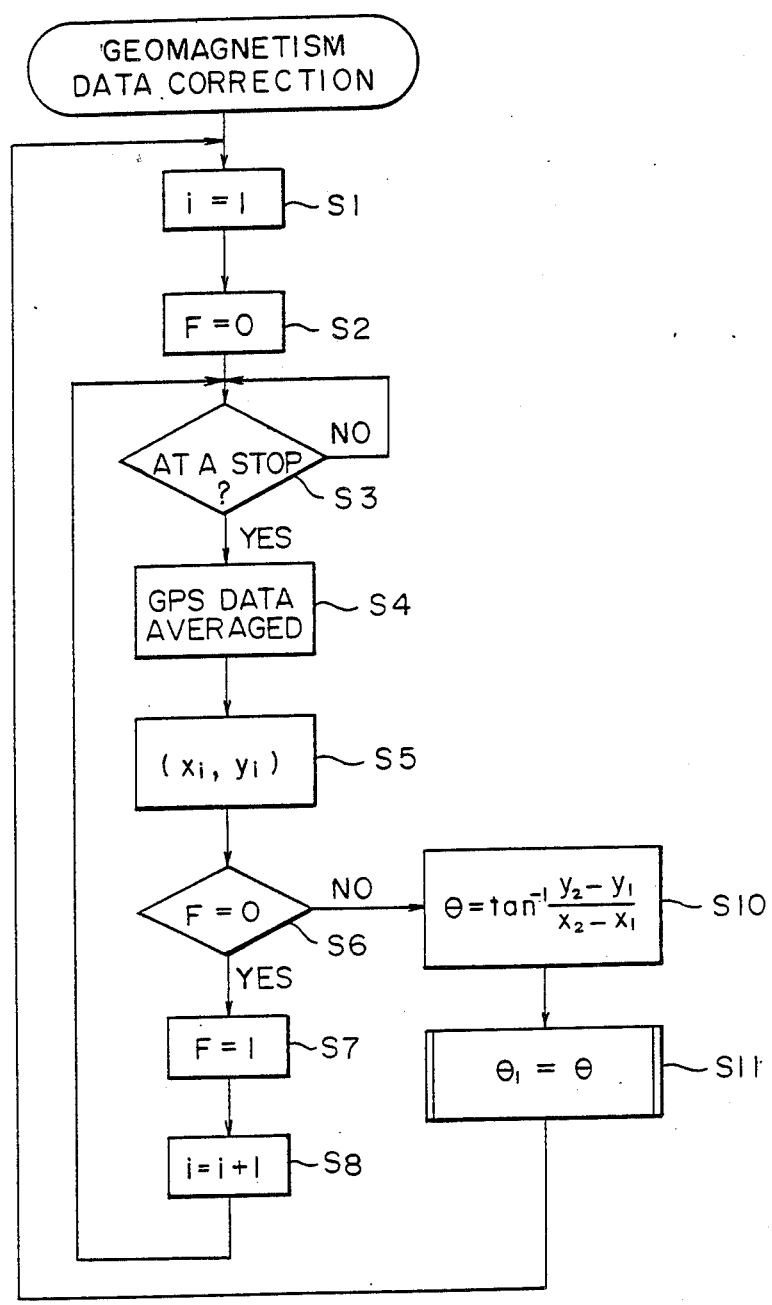
FIG. 12 is a flow chart of the process for effecting correction of error in measurement of the traveling azimuth by the geomagnetism sensor by use of the GPS data.

In FIG. 12, flag i is set to 1 in step S1, and flag F is set to 0 in step S2. In step S3, it is determined whether the vehicle is at a stop. Step S3 is repeated until it is determined that the vehicle is at a stop. When it is determined in step S3 that the vehicle is at a stop, GPS data on the present position of the vehicle during the stop are averaged to obtain averaged values $x_i$ and $y_i$ of X and Y for a given value of i. That is, when it is a first stop, first averaged values $x_1$ and $y_1$ are obtained. (steps S4 and S5) Then in step S6, it is determined whether the flag F is 0. When it is determined that the flag F is 0 in step S6, flag F is set to 1 in step S7, flag i is set to i+1 in step S8, and then the steps S3 to S5 are repeated to obtain second averaged values $x_2$ and $y_2$. After the second averaged values $x_2$ and $y_2$ are obtained, the flag F has been set to 1, and accordingly the flow process proceeds to step S10. In step S10, the traveling azimuth $\theta$ of the vehicle is calculated on the basis of formula $\theta = \tan^{-1}(y_2 - y_1)/(x_2 - x_1)$. Then in step S11, the traveling azimuth $\theta_1$ detected by the geomagnetism sensor is corrected by the traveling azimuth $\theta$ thus obtained on the basis of the GPS data.

We claim:

1. An automotive navigation system comprising a receiving means for receiving data signals related to a present position of a vehicle transmitted from satellites, a first present position detecting means for calculating a present position of the vehicle on the basis of the data signals, a display device for showing the present position of the vehicle on the basis of an output of the present position detecting means, a vehicle speed sensor for detecting a vehicle speed, and a data change limiting means responsive to said vehicle speed sensor for limiting change of the displayed present position of the vehicle displayed at the display device when the vehicle speed is lower than a predetermined speed.

2. An automotive navigation system as defined in claim 1 in which said display device is adapted to display a map and to show the present position on the map.

3. An automotive navigation system as defined in claim 2 in which said data change limiting means limits change of the output of the first present position detecting means to be given to the display device when the vehicle speed is zero.

4. An automotive navigation system as defined in claim 3 in which said data change limiting means inhibits change of the output of the first present position detecting means to be given to the display device throughout the time the vehicle speed is zero.

5. An automotive navigation system as defined in claim 3 said data change limiting means permits change of the output of the first present position detecting means to be given to the display device when the vehicle starts again, and the output of the present position detecting means which has been given to the display device is replaced by an average of the outputs of the present position detecting means during the period from the time the vehicle is stopped to the time the vehicle starts again.

6. An automotive navigation system as defined in claim 1 further comprising a second present position detecting means which includes a traveling azimuth detecting means which detects the traveling azimuth of the vehicle on the basis of an average of the outputs of the present position detecting means during a first period from the time in which the vehicle is stopped at one place to the time the vehicle starts again and an average of the outputs of the present position detecting means during a second period from the time in which the vehicle is stopped at another place to the time the vehicle starts again, and a correction means which corrects data on the traveling azimuth of the vehicle obtained by the second present-position detecting means on the basis of the traveling azimuth detected by said traveling azimuth detecting means.

7. An automotive navigation system as defined in claim 6 in which the first present position detecting means is switched to the second present position detecting means when a deterioration coefficient of said data signals from the satellites is larger than a predetermined value wherein the deterioration coefficient is determined according to the geometric relationship between the satellites and the vehicle.

8. An automotive navigation system comprising a receiving means for receiving data signals related to a present position of the vehicle transmitted from satellites, a present position detecting means for calculating a present position of the vehicle on the basis of the data signals, a display device for showing the present position of the vehicle on the basis of the output of the present position detecting means, a stop sensor for detecting that the vehicle is at a stop, and a data change limiting means responsive to said stop sensor for limiting change of the displayed present position of the vehicle displayed at the display device when the vehicle is at a stop.

9. An automotive navigation system comprising a receiving means for receiving data signals related to a present position of the vehicle transmitted from satellites, a present position detecting means for calculating a present position of the vehicle on the basis of the data signals, a random access memory which stores data on the present position of the vehicle detected by the present position detecting means under the control of a write command means and reads out the stored data on the present position of the vehicle under the control of a read command means, a display device for showing the present position of the vehicle on the basis of the data read out from the random access memory, a vehicle speed sensor for detecting the vehicle speed, and a data write limiting means which controls said write command means not to cause the data on the present position to be stored in the random access memory when the vehicle speed is lower than a predetermined speed.

* * * * *